United States Patent Office 3,137,999
Patented June 23, 1964

3,137,999
CHANGE-OVER VALVES, MORE PARTICULARLY FOR USE IN COMPOSITE MECHANICAL DRIVES
Norman Frederick North, North Romford, and Peter Bruno Kahn, Loughton, England, assignors to The Plessey Company Limited, Ilford, Essex, England, a company of Great Britain
Filed Oct. 19, 1961, Ser. No. 146,377
Claims priority, application Great Britain Oct. 25, 1960
11 Claims. (Cl. 60—39.14)

In our abandoned U.S.A. patent application Serial No. 98,706, we have described and claimed a valve adapted for use as the starting-control valve in a constant-speed control and starter unit as described in our co-pending U.S.A. application Serial No. 38,671, now Patent No. 3,021,011. In the latter application we have described and claimed a constant-speed control and starter unit, in which a reversible fluid-pressure displacement motor, hereinafter referred to as air motor, and a shaft adapted for at least operable connection to the shaft of a gas turbine engine including an engine-driven turbo-compressor for its combustion air, said compressor having an air bleed outlet and an output shaft required to be driven at a constant speed, are coupled to each other by a differential gear drive, a speed-control valve device responsive to the speed of said output shaft being connected to one side of the air motor, and a change-over valve being connected to the other side of the air motor for selectively connecting said other side to a fluid-pressure supply or to an atmospheric opening, the speed-control valve device being operative, in response to the speed of the output shaft, when said other side is connected to the atmospheric opening, to supply said one side of the air motor with fluid pressure, preferably bleed air from the compressor of the turbine engine, when the engine speed is low for causing the air motor to be power-driven in one direction for supplementing the speed of the output shaft and to connect said one side of the air motor in an atmospheric outlet when the engine speed is high, so as to permit the air motor to be driven in the opposite direction by reaction from the differential drive at such speed as to take up the excess speed of the outpuet shaft. In our abandoned application Serial No. 98,706 we have furthermore described a change-over valve for such units, this change-over valve being referred-to as starting control valve and being a slide valve equipped with two oppositely acting piston devices for moving the slide valve respectively to the starting position and to the constant-speed position and with pre-loaded spring means which tend to move the slide valve to a central position in which the motor connection is cut off so as to prevent any appreciable fluid-pressure driving power from being applied to the motor, the valve being preferably a spool-type slide valve, and in one embodiment the two ends of the spool, in conjunction with the end portions of the bore in which the spool operates, are utilised to constitute the said piston devices, and two oppositely acting pre-loaded and expansion-restrained springs may be respectively arranged in these end portions for biasing the valve to the centre position. The flow through the air motor must be reversed after starting, in order to enable the air motor to supplement the engine-derived speed of the constant-speed element. Thus while during the starting operation air under pressure from a pressure supply, for example a common pressure duct of a gas-turbine plant, flows to the air motor through the starting-control valve, under constant-speed output conditions such air must, when the engine speed is low, be supplied to the air motor through the speed-control valve. On the other hand this supply of air under pressure through the speed-control valve must be cut off not only when the engine-derived speed reaches or exceeds the desired output speed of the constant speed drive, but also during starting conditions. These requirements hitherto made the use of a relatively complicated speed-control valve necessary.

The present invention has for an object to provide an improved starting-control valve which permits the control valve to be simplified. According to the invention this is achieved by arranging for the starting-control valve to automatically cut off the supply of pneumatic pressure to the speed-control valve when the starting-control valve is in the starting position and conversely admitting air pressure to the control valve when the engine has reached idling speed, which is the minimum speed at which the air motor, without running at an excessively high speed, can supplement the engine-derived speed to obtain the desired output speed of the constant speed drive.

In a more specific aspect the present invention provides an improved starting-control valve which has connections to a pressure-supply duct, to one side of the air motor, to the air motor speed-control valve, and to an atmospheric vent, and which is constructed as a slide valve having a central position, to which it is biased by spring means and in which it blanks off the connection to the pressure-supply duct thus isolating the air motor from the pressure supply, while at one end position (starting position) it connects the supply duct to the air-motor connection and the speed-control-valve connection to the vent, and in the other end position (constant-speed position) it conversely connects the pressure-supply duct to the speed-control-valve connection and the air-motor connection to the atmospheric vent.

Subsidiary features of the change-over valve according to the invention and convenient ways of arranging the valve according to the invention in a constant-speed drive for driving, for example, an alternator in a turbo-jet aircraft will now be described with reference to the drawings accompanying the specification, in which—

Figure 1:
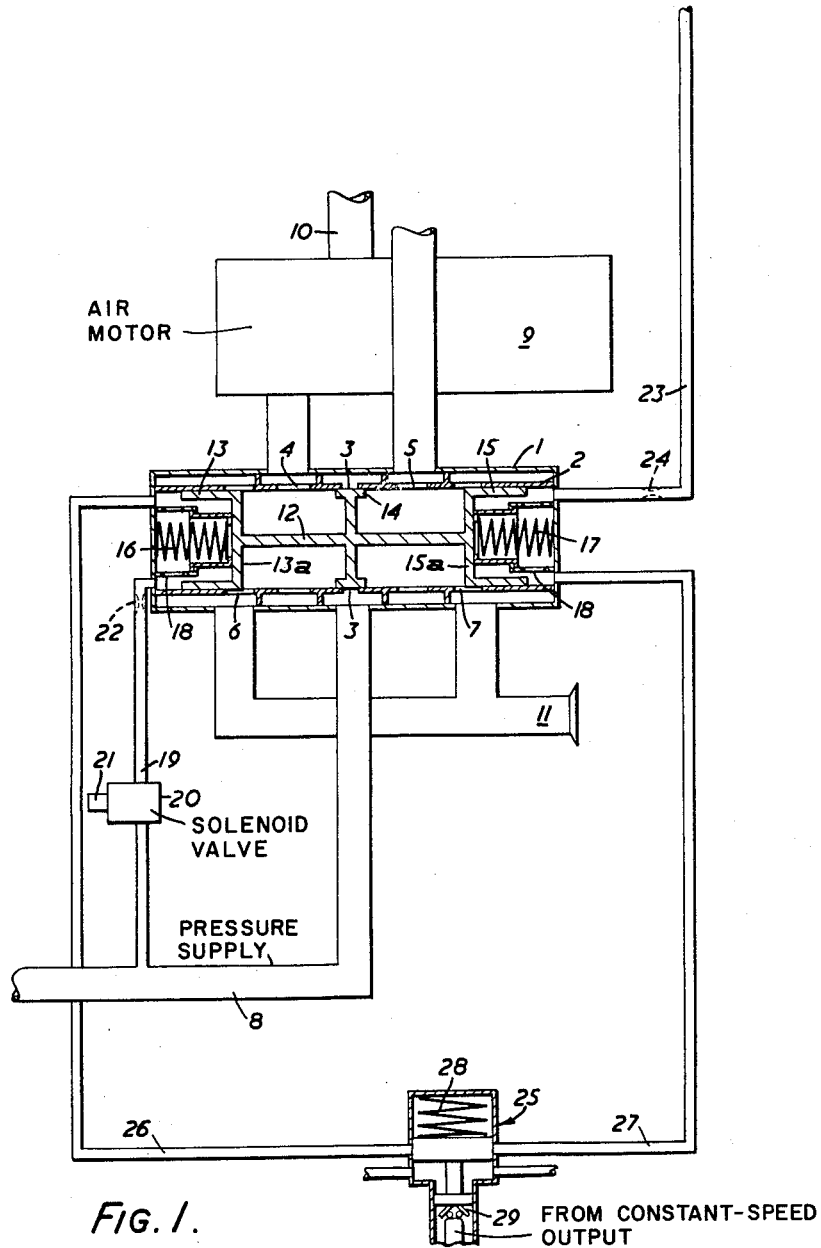
FIGURE 1 is a somewhat diagrammatic axial section of one form of starting-control valve according to the invention, also showing some of its connections.

Referring now first to FIGURE 1, the starting-control valve of a constant-speed-drive and starter unit for use with a gas-turbine engine 32 equipped with an aerodynamic compressor 32a driven by the engine to supply its combustion air comprises a housing 1 fitted with a valve sleeve 2 having five axially spaced sets of ports 3, 4, 5, 6 and 7. The central set of ports 3 communicates with a pressure supply duct 8; the ports 4, next adjacent to ports 3 at one side, communicate with one side of a displacement-type reversible air motor 9. As may be seen in FIGURE 2, this air motor, together with a shaft for connection to a combustion turbine engine 32, a speed-control valve 37, and with a differential gear drive 38 interposed between the shaft for connection to such engine, the air motor, and the constant-speed output shaft 40, constitutes a constant-speed-drive and starter unit of the kind described in our said co-pending application Serial No. 38,671. The other side of the air motor 9 is connected by a pipe 10 to the speed-control valve 37, which is of the general kind described in the said co-pending U.S.A. application Serial No. 38,671 and preferably of the kind described in our co-pending patent application Serial No. 145,515 or an even more simplified modification thereof. The ports 5, next adjacent to ports 3 at the opposite side, lead to another connection of the said control valve, while the outer sets of ports 6 and 7 both lead to an atmospheric vent 11. Arranged in the sleeve 2 is a spool-type slide valve element 12 having three lands 13, 14 and 15. The lands 13, 14, 15 are so arranged that, when the spool 12 is in its illustrated central position, the central land 14 blanks off the pressure-duct ports 3, while the outer lands 13 and 15 restrict or blank off the atmospheric vent ports 6 and 7 and that the lands 13 and 15 respectively blank off one of these ports and uncover the other when the valve element 12 is in one or the other of its two end positions. The housing 1 is closed at its two ends, and the lands 13 and 15 are provided with web portions 13a and 15a so as to constitute cylinder-and-piston means adapted to move the slide valve to one or the other of its two end positions under suitable pressure conditions at the ends of the sleeve 2. Accommodated in each end portion of the housing is a pre-loaded thrust spring 16 or 17 and a retaining device 18 which prevents the spring 16 or 17 from expanding beyond the position in which the spool 12 assumes its central position in the sleeve 2.

In order to control the operation of the valve, that end of the sleeve 2 which co-operates with piston 13, is connected to the pressure duct 8 by a line 19 which contains a solenoid valve 20 having an atmospheric vent port 21. The valve 20 is so arranged that the said end chamber of the sleeve 2 is normally connected to the atmospheric vent 21 but is, when the valve 20 is energised, connected to the common pressure duct 8, a restrictor 22 being interposed in the line 19 between the solenoid valve 20 and the change-over valve housing 1. The other end of the sleeve 2 in the change-over valve housing 1 is connected to the air bleed of the engine compressor 32a through a line 23 containing a restrictor 24.

When the engine 32 is to be started, and after starting until it has reached idling speed, starter solenoid valve 20 is energised. Since under these conditions the engine 32 is either stationary or runs only at a slow speed, the engine compressor bleed-air pressure acting on the piston 15 is considerably lower than the pressure in the supply duct 8, which acts on piston 13. The latter pressure therefore moves the spool 12 against the pressure of spring 17 to the end position in which the supply-duct ports 3 are allowed to communicate with the air-motor ports 4, and in which also the ports 5 leading to the speed-control valve are vented through port 7. This enables the control valve to speed-control the operation of the air motor for starting the engine and for so-called ground running i.e. for driving the alternator and if desired engine accessories when the engine is disconnected from the differential gear drive. It also prevents, after the starting of the engine, but before the latter has reached idling speed, the air motor from being driven in the opposite direction to supplement the engine-derived alternator speed, which would be undesirable because to achieve the stipulated constant output speed of shaft 40, an excessively high speed of the air motor would be required when the engine speed is lower than idling speed. When the engine reaches starter-decoupling speed, the energisation of the solenoid valve 20 is cut off, for example by means of a control operated by the pilot, so that line 19 is now vented to the atmosphere. The pressure at the end of housing 1 containing piston 13 will thus decrease (under the control of the restrictor 22), and the spring 17 will restore the valve spool 12 to its illustrated central position. However although some pressure will at that time exist at the engine air bleed, the action of this pressure on piston 15 will not be sufficient to overcome the pre-load of spring 16 until the engine has reached idling speed. When the engine reaches idling speed, the bleed-air pressure acting on piston 15 is sufficient to overcome the pre-loading of spring 16, and the valve spool 12 will move to its other end position, in which the control-valve connection 5 communicates with the common pressure duct 8, and the air motor ports 4 are vented through atmospheric ports 6, thus allowing the air motor 9 to be air-driven under the control of the speed-control valve 37, to supplement the engine-derived speed of the alternator.

In order to avoid damage to the alternator or other element to be driven at costant speed by a shaft 14 if the speed-control valve should get stuck in a position in which the air motor supplements the engine-derived speed and this engine-derived speed is higher than the desired output speed, an emergency shut-down valve 25 is provided, which when operated opens unrestricted atmospheric vent lines 26 and 27 respectively leading to the two ends of the valve housing 1. Valve 25 is normally maintained closed by a spring 28, but is forced open by an overspeed governor 29 when the speed of the alternator or the like rises above the predetermined limit. When both ends of the housing 1 are vented through the unrestricted passages 26 and 27, valve spool 12 will at once return to its illustrated central position, in which the air supply ports 3 are blanked off.

Figure 2:
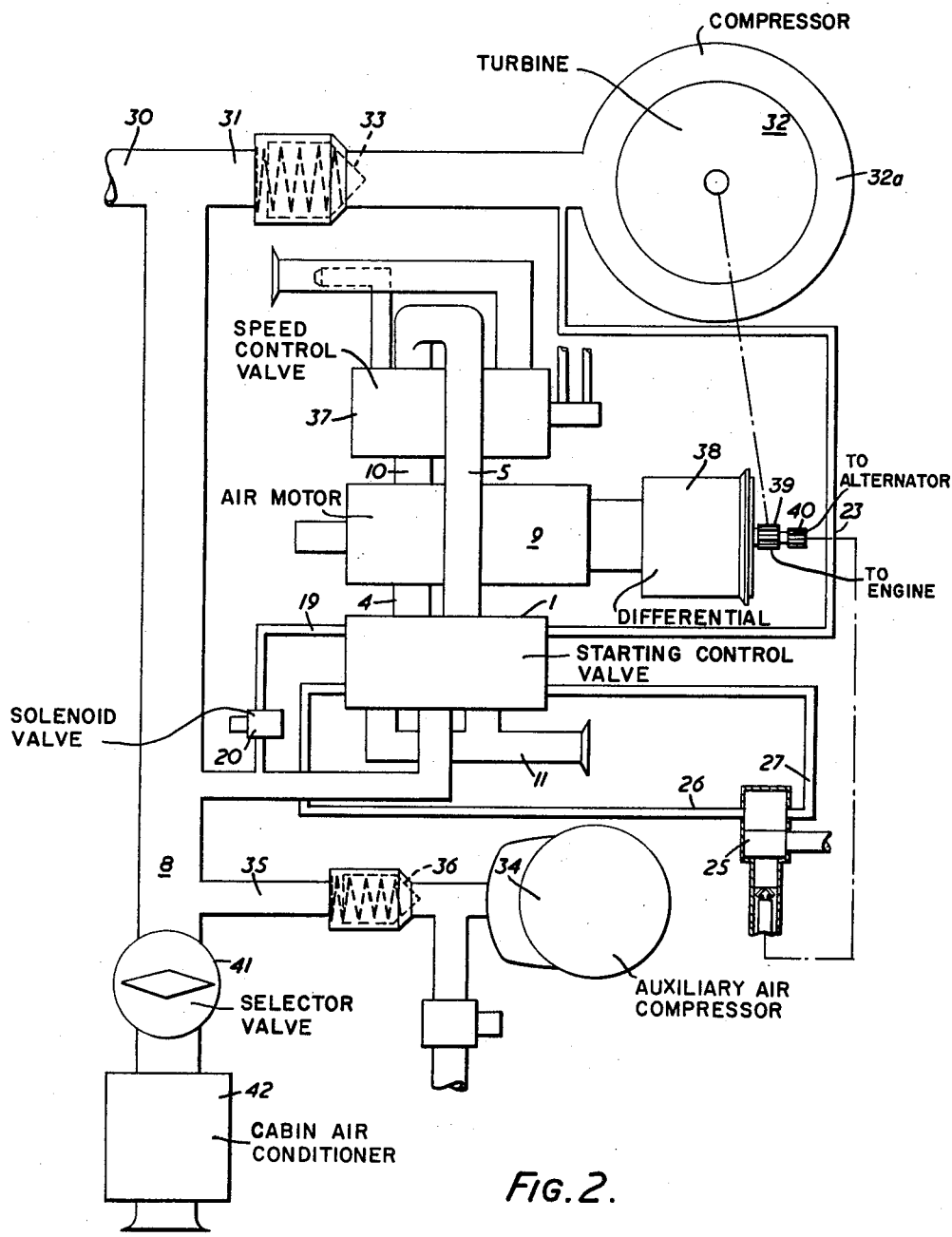
FIGURE 2 is a diagram showing the arrangement of the valve of FIGURE 1 in an aircraft power plant.

Referring now further to FIGURE 2, it will be seen that the pressure-supply duct 8 is connected through two passages 30, 31 to the bleed of the engine-driven aerodynamic compressor 32a of each of two gas-turbine propulsion engines 32 of an aircraft, non-return valves 33 being interposed in each of the passages 30, 31 to prevent reverse flow if one or both of the engines are stationary, and an auxiliary supply, for example from an auxiliary air compressor 34 is also adapted to feed the duct 8, if required, through a branch 35, which likewise contains a non-return valve shown at 36. The speed-control valve, to which the air motor connection 10 and the port 5 of the change-over valve 1 are connected, is shown at 37, while 38 is the differential gear unit of which one shaft is driven by the air motor 9, while of its other two shaft connections 39 and 40 the former is coupled to one of the aircraft engines and the other is the output shaft connected to the alternator or other element to be driven at constant speed. The pressure-supply duct 8 may, as shown, be additionally connected, through a selector valve 41, to a cabin air-conditioning supply system 42.

Figure 3:
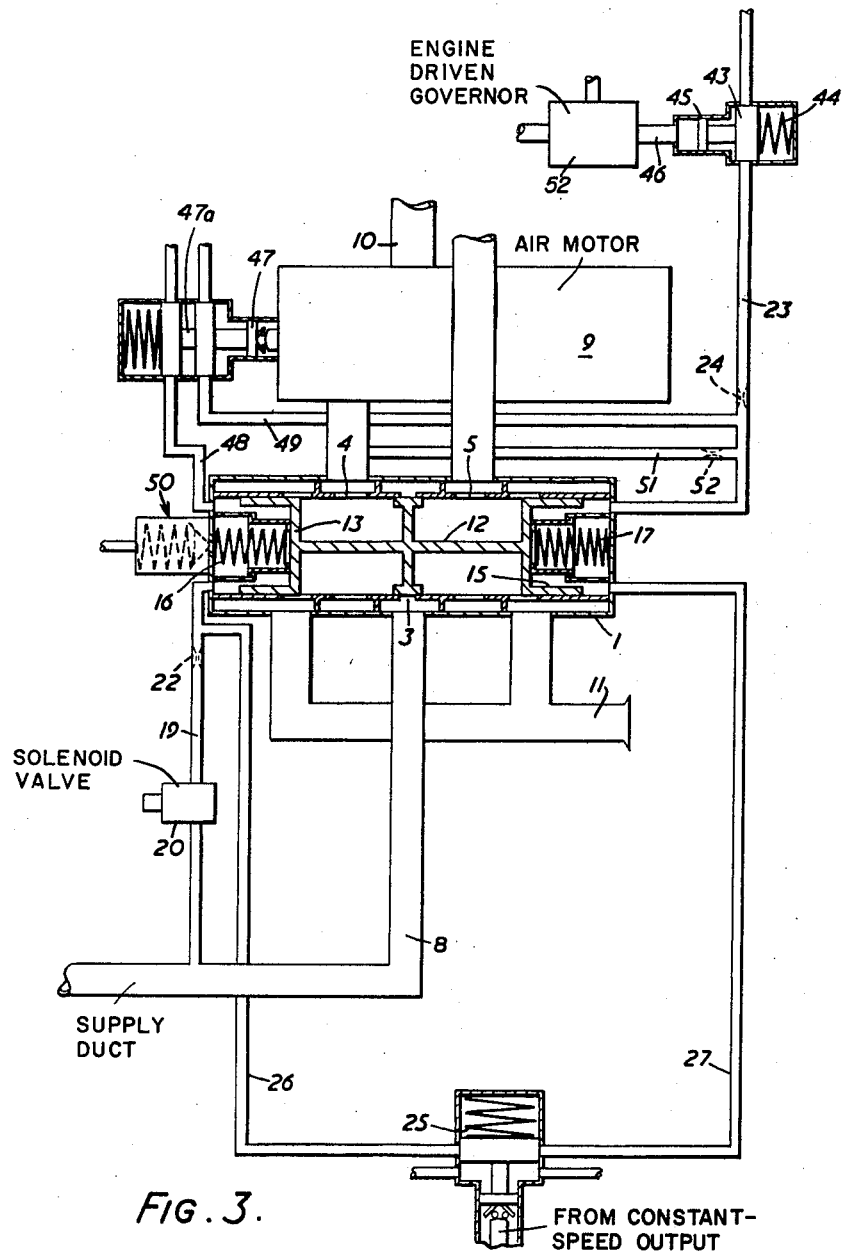
FIGURE 3 is a view, similar to FIGURE 1, showing a modified starting-control valve with part of the apparatus immediately related to it.
Figure 4:
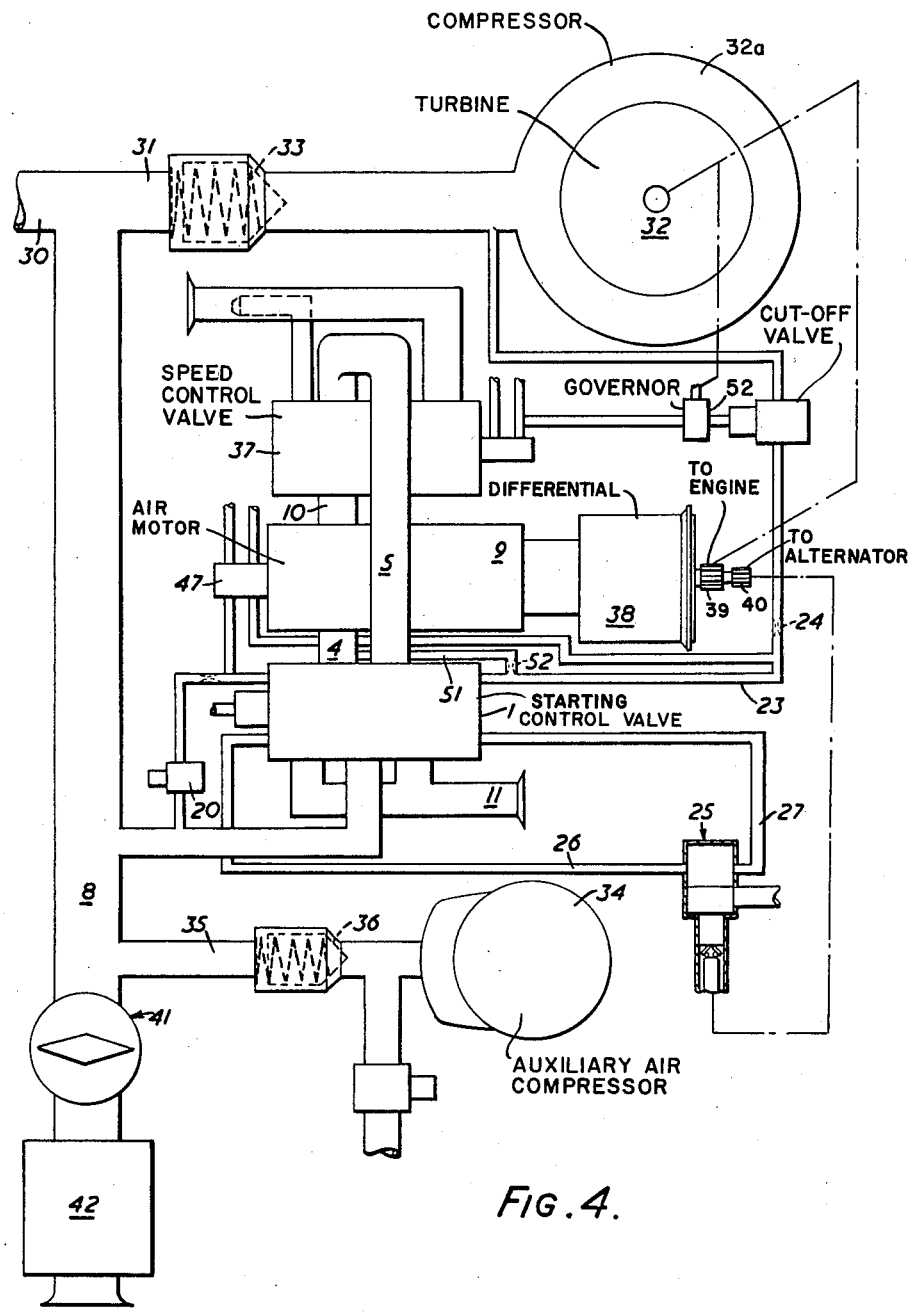
FIGURE 4 is a diagram similar to that of FIGURE 2, relating to the modified valve of FIGURE 3.

FIGURE 3, in which the same references are used to indicate parts identical with FIGURE 1, shows an arrangement which incorporates additional safety devices. The relation of these to the constant speed drive is shown in FIGURE 4, in which elements corresponding to FIGURE 2 bear the same references as in the latter figure.

To avoid the need of using the bleed-air pressure from the engine compressor 32a for determining the moment at which the valve spool 12 is moved to the constant-speed position in which air from supply duct 8 is allowed to reach the speed-control valve through ports 5, according to a subsidiary feature of the invention a cut-off valve 43, normally held in the cut-off position by a spring 44, is included in the line 23 through which bleed air is admitted to the end of housing 1 containing the piston 15, a hydraulic piston 45 being arranged to open the valve 43 when the piston 45 is supplied through a line 46 with hydraulic pressure under the control of a governor 52 driven by the engine 32. Furthermore protection of the air motor is required in case for any reason the valve element 12 should move to its constant-speed position before the engine has reached idling speed, or if the speed of the engine should drop below idling speed, so that an excessive air-motor speed would be required to supplement the engine-derived speed of the alternator or the like, or if the starter solenoid 20 is operated when the engine is disconnected from the drive, thus removing the load from the air motor. This protection is achieved by an air-motor overspeed governor 47, which, when the air-motor speed exceeds a predetermined value, moves a valve spool 47a to vent two lines 48 and 49 leading to the two ends of the valve housing. When the lines 48 and 49 are vented, valve spool 12 of the change-over valve 1 is returned by springs 16 and 17 to its illustrated central position. It will be observed that there are no restrictors between lines 48 and 49 and the ends of valve housing 1.

Finally it may be desirable to limit the pressure supply to the air motor during starting and ground running, and thus the air motor torque, irrespective of variations of pressure in the supply duct 8. In order to achieve this, a pressure relief valve 50, preset to a desired maximum pressure is, according to a feature of the invention, preferably connected to the end of housing 1 containing piston 13, and a branch of line 23, that is of the line which connects the other end of housing 1 to the hydraulically controlled valve 43, is connected to air motor port 4 and containing a restrictor 52. Due to the presence of the restrictor 22 in line 19, the pressure at the end of housing 1 containing piston 13 is determined by the setting of relief valve 50. When the valve spool 12 is in the starting position, and the pressure in air-motor port 4 tends to rise above a value which is lower than the pressure at the other end of the housing 1 by an amount corresponding to the force of the compressed spring 17, spring 17 will return the valve spool 12 towards its centre position by an amount sufficient to allow the resultant decrease in the tension of spring 17 to restore the balance, thereby restricting to a greater or less extent the exposed part of port 3 and thus producing a pressure drop between line 8 and air-motor connection 4 which will minimise the rise of pressure in the latter connection beyond the desired value.

What we claim is:

1. A constant-speed-drive and starter unit for use with a variable-speed engine and with a fluid-pressure supply source, the unit comprising: a displacement-type reversible air motor; an output shaft to be driven at a constant speed; a further shaft for driving connection to such engine; a differential gear drive interconnecting said motor, said output shaft, and said further shaft; and control means for said motor including a speed-control valve connected to one side of the air motor and having means operating said speed-control valve in accordance with a speed of the output shaft to connect the air motor to such fluid-pressure supply source for causing the motor to be pressure-driven in one direction to supplement the speed of the output shaft when the speed of said further shaft is low, and to connect said side of the motor to an exhaust so as to permit the motor to be driven by the differential gear drive in the opposite direction for taking up excess speed when the speed of said further shaft is high, a starting-control valve connected to the other side of the air motor, to the fluid-pressure supply, to the speed-control valve, and to the atmospheric connection, said starting-control valve having a starting position in which it connects the fluid-pressure supply to said other side of the air motor and connects the speed-control valve to the atmospheric connection, and a constant-speed position in which it connects said other side of the air motor to the atmospheric connection and the speed control valve to the fluid-pressure supply.

2. A constant-speed-drive and starter unit as claimed in claim 1, wherein said starting-control valve has between said starting and constant-speed positions, a neutral position in which it isolates the speed-control valve connection from both the atmospheric connection and the fluid-pressure supply.

3. A constant-speed-drive and starter unit as claimed in claim 2 for use with a variable-speed gas-turbine engine having an engine-driven aerodynamic compressor for its combustion air, said compressor having a bleed, and with an auxiliary fluid-pressure supply source for starting said engine, including preloaded spring means normally holding the valve in its neutral position, means operable for moving the valve to the starting position, and cylinder-and-piston means for connection to the bleed of such compressor and operable by the compressor bleed-air pressure to move the valve to the constant-speed position when the said bleed-air pressure reaches a predetermined value.

4. A constant-speed-drive and starter unit as claimed in claim 2 for use with a variable-speed gas-turbine engine having an engine-driven aerodynamic compressor for its combustion air, said compressor having a bleed, and with an auxiliary fluid-pressure supply source for starting such engine, wherein said starting-control valve includes preloaded spring means normally holding it in the neutral position, bi-laterally acting cylinder-and-piston means connectable at one side to the bleed of such compressor to urge the valve to the constant-speed position against the spring load under the action of the compressor bleed-air pressure, and a valve connected to the other side of said cylinder-and-piston means and selectively operable to place said other side into communication with the auxiliary fluid-pressure so as to cause air pressure from said supply with the valve towards its starting position, or to an atmospheric outlet to vent said other side of the bi-laterally acting cylinder-and-piston means to the atmosphere.

5. A constant-speed-drive and starter unit as claimed in claim 4, further comprising an emergency shut-down valve responsive to excess speed of the output shaft to bi-laterally vent said cylinder-and-piston means so as to permit the spring means to move the starting-control valve to its neutral position.

6. A constant-speed-drive and starter unit as claimed in claim 4, further comprising a vent-valve device responsive to excess speed of the air motor to bi-laterally vent said cylinder-and-piston means so as to permit the spring means to move the starting-control valve to its neutral position.

7. A constant-speed-drive and starter unit as claimed in claim 4, further comprising two separate vent-valve devices respectively responsive to the speed of the output shaft and to the speed of the air motor and each operative in response to excess speed to vent both ends of said cylinder-and-piston means so as to permit the spring means to move the starting control valve to its neutral position.

8. A starting-control valve for selectively controlling the connection to a fluid-pressure supply source or to an atmospheric connection of one side of a displacement-type reversible air motor forming part of a constant-speed-drive and starter unit for use with a variable-speed gas-turbine engine having an engine-driven aerodynamic compressor for its combustion air, said compressor having a bleed, and with a fluid-pressure supply source for starting such engine and of a speed control valve connected to the other side of said air motor, the starting-control valve comprising in combination a sleeve closed at both ends and having a central port for connection to such fluid-pressure supply source, two ports at opposite sides of said central port for respective connection to such air motor and speed-control valve, and an atmospheric port at each side beyond said two ports, a spool-type slide valve element longitudinally movable in said sleeve between a starting position adjacent to one end of the sleeve, a constant-speed position adjacent to the other end of the sleeve, and a neutral position intermediate between said starting and constant-speed positions, said sleeve valve element having a central land of sufficient length to blank off said central port when the element is in said neutral position, two outer lands so spaced from the central land in opposite directions as to respectively expose, when the element is in said neutral position, part of the two vent ports, the length of each outer land being sufficient to blank the respective vent port when the element is in its starting or in its constant-speed position, preloaded centering spring means normally holding the element in its neutral position, means for connecting the sleeve end beyond the control valve port to such bleed, and means for connecting the other end of the sleeve selectively to such fluid pressure source or to an atmospheric vent.

9. A starting-control valve as claimed in claim 8, further comprising a vent valve operable to simultaneously vent both ends of the sleeve and means responsive to the speed of such engine to operate said vent valve at a predetermined speed of such engine.

10. A starting-control valve as claimed in claim 8, including a normally closed cut-off valve in the bleed air connection to said one end of the sleeve and means responsive to the speed of such engine and operative to open said cut-off valve when such speed reaches a predetermined value.

11. A starting-control valve as claimed in claim 8, including a restricted connection between said one end of the sleeve and the air-motor port, a further restriction being provided in the line for the selective venting of, or admission of fluid pressure to, the other end of the cylinder.

References Cited in the file of this patent
UNITED STATES PATENTS
2,959,918     West _____ Nov. 15, 1960